(12) United States Patent
Wu et al.

(10) Patent No.: US 11,754,790 B2
(45) Date of Patent: Sep. 12, 2023

(54) EXCHANGEABLE OPTIC FIBER CONNECTOR ASSEMBLY

(71) Applicant: ACON OPTICS COMMUNICATIONS INC., New Taipei (TW)

(72) Inventors: Jia Rong Wu, New Taipei (TW); Tsung Yao Hsu, New Taipei (TW)

(73) Assignee: ACON OPTICS COMMUNICATIONS INC., New Taipei (TW)

( * ) Notice: Subject to any disclaimer, the term of this patent is extended or adjusted under 35 U.S.C. 154(b) by 0 days.

(21) Appl. No.: 17/938,935

(22) Filed: Sep. 7, 2022

(65) Prior Publication Data

US 2023/0097105 A1 Mar. 30, 2023

(30) Foreign Application Priority Data

Sep. 28, 2021 (TW) ................................. 110211403

(51) Int. Cl.
*G02B 6/38* (2006.01)
(52) U.S. Cl.
CPC .......... *G02B 6/3879* (2013.01); *G02B 6/3873* (2013.01)
(58) Field of Classification Search
CPC .................................................. G02B 6/3879
See application file for complete search history.

(56) References Cited

U.S. PATENT DOCUMENTS

| | | | |
|---|---|---|---|
| 10,078,186 B1* | 9/2018 | Hsu | G02B 6/3857 |
| 2010/0220961 A1* | 9/2010 | De Jong | G02B 6/38875 |
| | | | 385/77 |
| 2016/0047993 A1* | 2/2016 | Hioki | G02B 6/3869 |
| | | | 385/139 |
| 2020/0271867 A1* | 8/2020 | Ishikawa | G02B 6/3879 |

FOREIGN PATENT DOCUMENTS

CN 111610599 9/2020

* cited by examiner

*Primary Examiner* — Michael Stahl
(74) *Attorney, Agent, or Firm* — JCIPRNET

(57) ABSTRACT

An exchangeable optic fiber connector assembly, including a pair of optic fiber connectors and a switching structure, is provided. Each optic fiber connector has a first locking portion and a first stopping portion. The switching structure has a pair of guiding slots. The optic fiber connectors respectively pass through the guiding slots to be movable and rotatable along the corresponding guiding slots. The switching structure further has a plurality of second locking portions and a plurality of second stopping portions disposed at two opposite ends of each guiding slot. Each optic fiber connector is locked with one of the second locking portions through the first locking portion, and the second stopping portion next to the locked second locking portion is located on a moving path of the first stopping portion.

13 Claims, 10 Drawing Sheets

EXCHANGEABLE OPTIC FIBER CONNECTOR ASSEMBLY

CROSS-REFERENCE TO RELATED APPLICATION

This application claims the priority benefit of Taiwan application serial no. 110211403, filed on Sep. 28, 2021. The entirety of the above-mentioned patent application is hereby incorporated by reference herein and made a part of this specification.

BACKGROUND

Technical Field

The invention relates to an exchangeable optic fiber connector assembly.

Description of Related Art

Since optic fiber has advantages of high bandwidth and low loss, it has been widely used as signal transmission media in recent years. Therefore, along with technical expansion of optical communication networks, popularity of wide area networks such as Internet and internal networks is increased, and meanwhile communication traffic is increased.

In addition, many optic fiber connectors include a plurality of plugs arranged side by side to implement multichannel communication. Sometimes, in use, it hopes that the arrangement of the plugs may be exchanged or changed according to actual demands, but in the prior art, it is impossible to switch arrangement to reconnect the connector to the optic fiber without disconnecting or separating the connector from its corresponding optic fiber.

SUMMARY

The invention is directed to an exchangeable optic fiber connector assembly, in which a pair of optic fiber connectors is adapted to move without being disassembled, so as to smoothly achieve a purpose of exchanging the optic fiber connectors.

The invention provides an exchangeable optic fiber connector assembly including a pair of optic fiber connectors and a switching structure. Each of the optic fiber connectors has a first locking portion and a first stopping portion. The switching structure includes a pair of guiding slots, the optic fiber connectors respectively pass through the corresponding guiding slot to be movable and rotatable along the corresponding guiding slot. The switching structure further includes a plurality of second locking portions and a plurality of second stopping portions disposed at two opposite ends of each guiding slot. Each optic fiber connector is locked with one of the second locking portions through the first locking portion, and the second stopping portion next to the locked second locking portion is located on a moving path of the first stopping portion.

In an embodiment of the invention, the pair of guiding slots is a part of a circular trajectory.

In an embodiment of the invention, a central angle of each of the guiding slots is 90 degrees.

In an embodiment of the invention, optical signals transmitted/received by the pair of optic fiber connectors are different from each other.

In an embodiment of the invention, the exchangeable optic fiber connector assembly further includes a locking member and a cable module, the optic fiber connectors pass through the switching structure and are connected to the cable module, and the locking member is locked with the optic fiber connectors and the cable module to limit the optic fiber connectors from moving relative to the switching structure.

In an embodiment of the invention, the switching structure includes a housing and a cover, the cover has the pair of guiding slots, and the housing has the plurality of second locking portions and the plurality of second stopping portions.

In an embodiment of the invention, the switching structure further has a plurality of guiding ribs, which are respectively arranged on a side edge of each of the guiding slots. Each optic fiber connector moves in the corresponding guiding slot along the guiding rib through the first locking portion.

In an embodiment of the invention, the switching structure includes a housing and a cover, the cover has the pair of guiding slots, and the housing has the plurality of second locking portions, the plurality of second stopping portions, and the plurality of guiding ribs.

In an embodiment of the invention, the first locking portion and the first stopping portion of the optic fiber connector are opposite to each other in inversion.

In an embodiment of the invention, the first locking portion is located at a plug tail section of the optic fiber connector and is a convex portion with a T-shaped profile.

In an embodiment of the invention, the first stopping portion is located at a plug tail section of the optic fiber connector and is a convex portion with a wedge-shaped profile.

In an embodiment of the invention, the first locking portion and the first stopping portion face away from each other across a plug tail section of the optic fiber connector.

In an embodiment of the invention, the optic fiber connector is locked with one of the second locking portions through the first locking portion, and the second stopping portion next to the locked second locking portion is located on a rotating path of the first stopping portion, and the pair of optic fiber connectors rotate in a same direction to be locked with the switching structure or released from the switching structure.

Based on the above description, the pair of optic fiber connectors of the optic fiber connector assembly are respectively movably passes through the pair of guiding slots of the switching structure, so that the optic fiber connectors may move and rotate along the guiding slots, where each of the optic fiber connectors has the first locking portion and the first stopping portion adapted to produce/not produce structural interference with the second locking portion and the second stopping portion at two ends of the guiding slot for locking with or releasing from the switching structure. In this way, a user may change a position of the optic fiber connectors on the switching structure as described above according to actual needs, so as to adjust a docking orientation of the optic fiber connector assembly and a docked connector, thereby achieving the effect of switching the optic fiber connectors.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
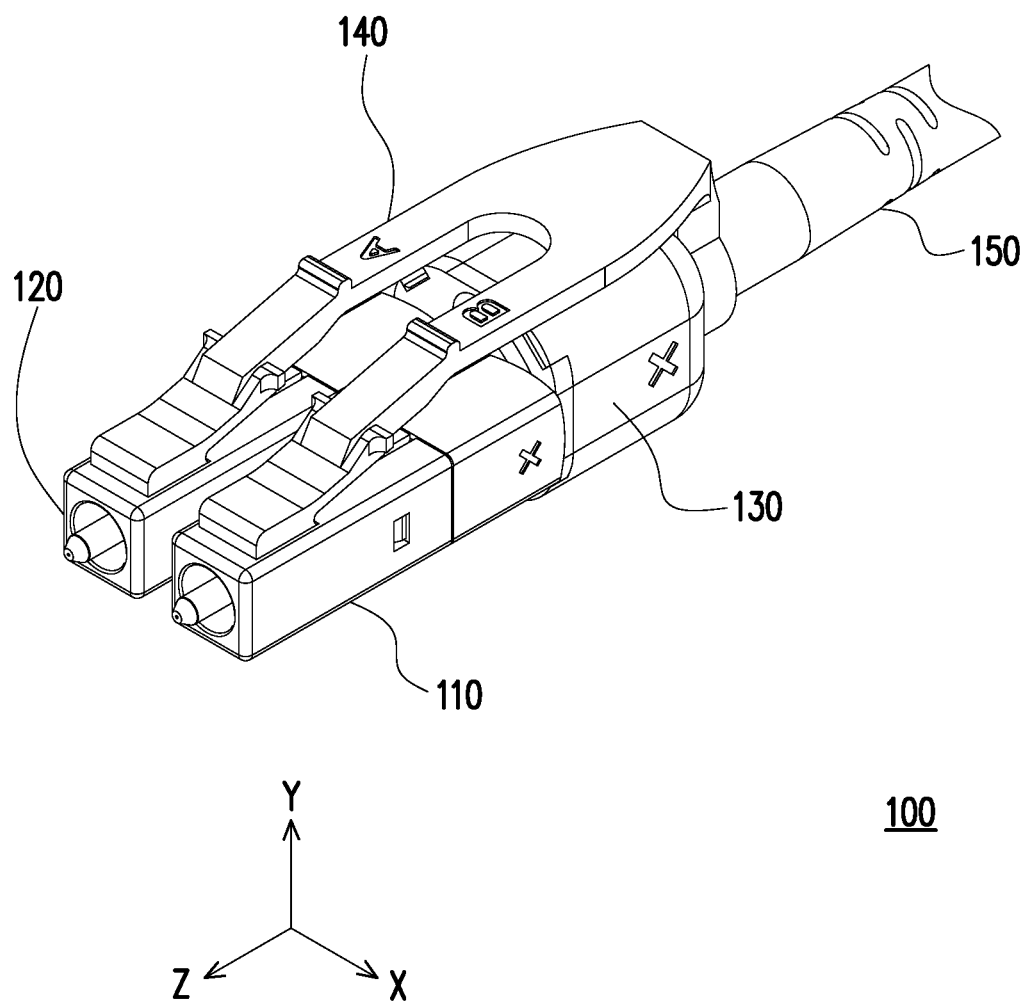
FIG. 1 is a schematic diagram of an exchangeable optic fiber connector assembly according to an embodiment of the invention.
Figure 2:
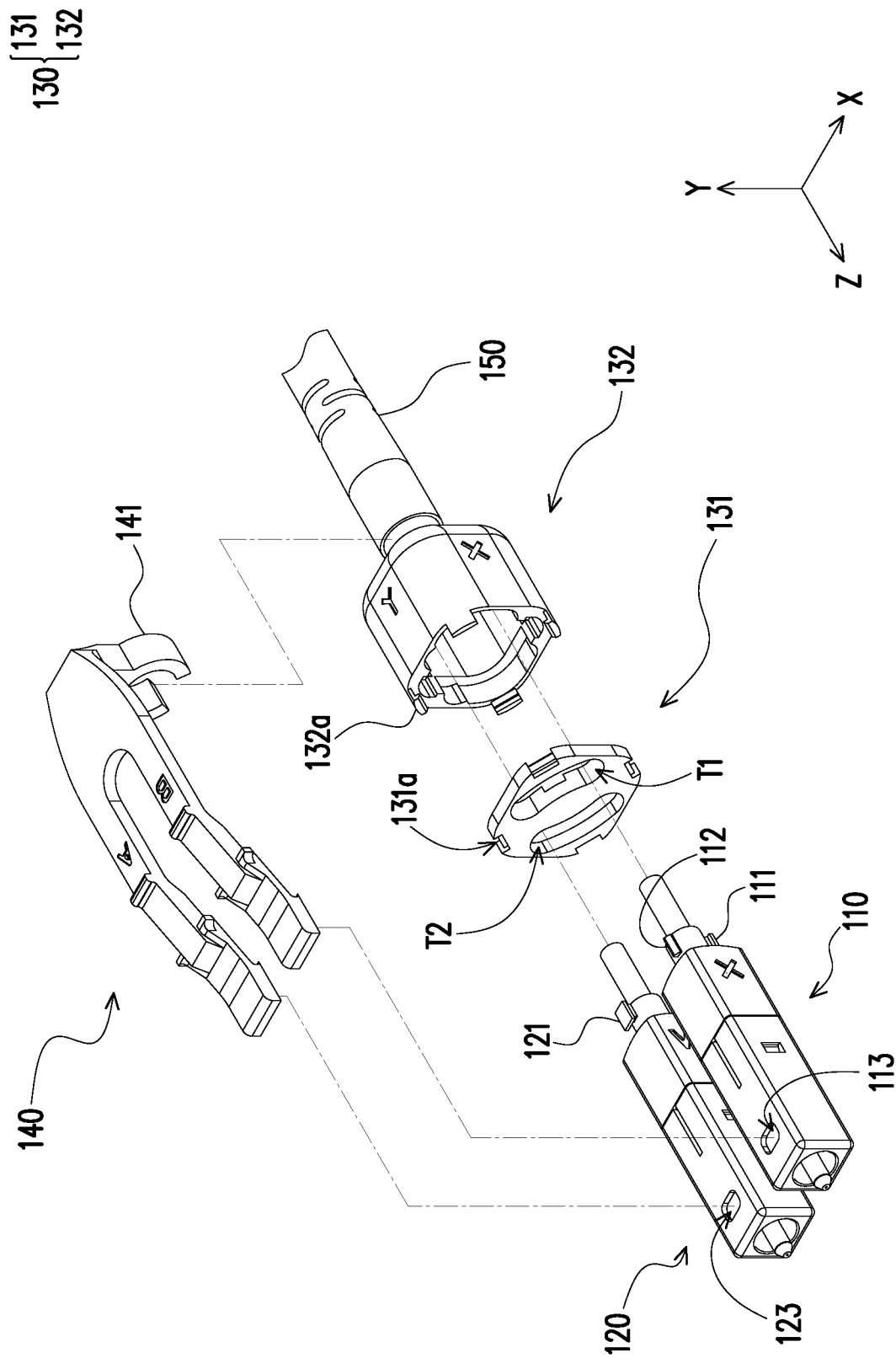
FIG. 2 and FIG. 3 are respectively exploded views of the exchangeable optic fiber connector assembly of FIG. 1.
Figure 3:
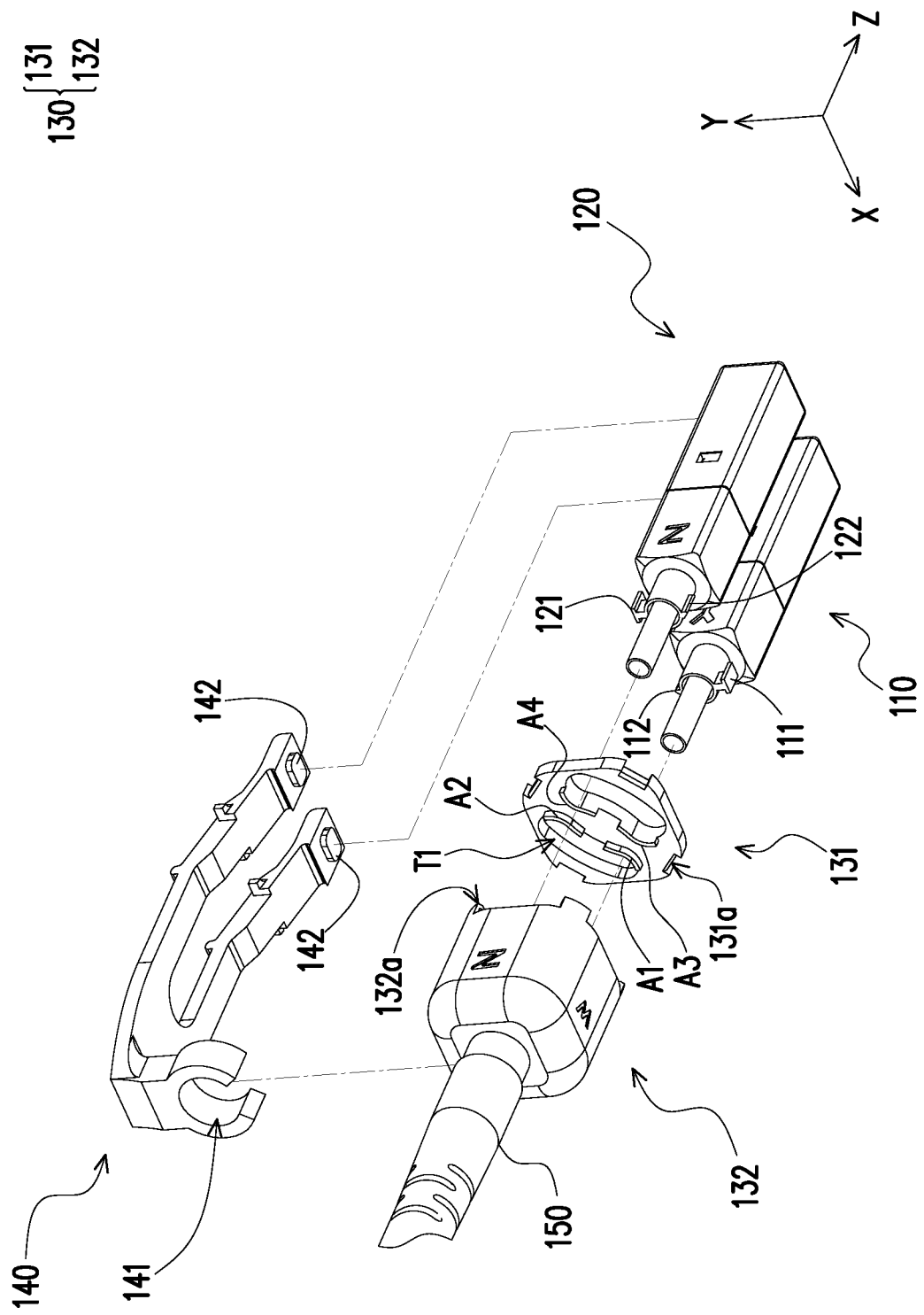

FIG. 1 is a schematic diagram of an exchangeable optic fiber connector assembly according to an embodiment of the invention. FIG. 2 and FIG. 3 are respectively exploded views of the exchangeable optic fiber connector assembly of FIG. 1. Referring to FIG. 1 to 3 at the same time, in the embodiment, an exchangeable optic fiber connector assembly 100 (which is briefly referred to as the optic fiber connector assembly 100 hereinafter) includes a pair of optic fiber connectors 110, 120, a switching structure 130, a locking member 140, and a cable module 150. The optic fiber connectors 110 and 120 respectively pass through the switching structure 130 and are connected to the cable module 150. Assembling lines of the optic fiber connectors 110 and 120 shown in FIG. 2 and FIG. 3 may also represent optic fiber core wires, which extend from the optic fiber connectors 110 and 120 and are connected to the cable module 150. The optic fiber connectors 110, 120 have first locking portions 111, 121 and first stopping portions 112, 122. The switching structure 130 has a pair of guiding slots T1, T2, the optic fiber connectors 110, 120 respectively pass through the guiding slots T1, T2, and the optic fiber connectors 110, 120 are movable and rotatable along the corresponding guiding slots T1 T2.

The locking member 140 is locked with the optic fiber connectors 110 and 120 and the cable module 150 to limit the optic fiber connectors 110 and 120 from moving relative to the switching structure 130. As shown in FIG. 2 and FIG. 3, one end of the locking member 140 has a C-shaped locking ring 141, which is used to lock with the cable module 150 at a position next to the switching structure 130, and another end of the locking member 140 has a pair of convex portions 142, which are respectively locked in recesses 113 and 123 of the optic fiber connectors 110 and 120. In brief, although the optic fiber connectors 110, 120 may move relative to the switching structure 130, by using the locking member 140 to lock the optic fiber connectors 110, 120 and the cable module 150 together, the above relative movement may be effectively removed.

In the embodiment, optical signals transmitted/received by the optic fiber connectors 110 and 120 are different from each other, for example, polarities thereof are different. Therefore, in order to facilitate clear identification of relative positions and docking positions of the optic fiber connectors 110 and 120, the optic fiber connector assembly 100 is provided with referential numbers "X", "Y", "W" and "Z" on different surfaces of the switching structure 130, and meanwhile the four referential numbers are also provided on different surfaces of plug structures of the optic fiber connectors 110 and 120, so that the user may learn current docking positions of the optic fiber connectors 110 and 120. For example, as shown in FIG. 1 to FIG. 3, a side surface of the optic fiber connector 110 has a referential number "X" corresponding to the switching structure 130, and a side surface of the optic fiber connector 120 also has the referential number "X" corresponding to the switching structure 130. The embodiment also provides rectangular coordinates X-Y-Z, and allows the rectangular coordinates X-Y-Z to have a corresponding relationship with the referential numbers "X" and "Y" of the switching structure 130. Namely, the rectangular coordinates X-Y-Z are formed based on the switching structure 130, and the optic fiber connectors 110 and 120 arranged side by side in an orientation of the referential number "X" shown in the figures also mean that the optic fiber connectors 110 and 120 are arranged side by side along an X-axis and are located on an X-Z plane. It also means that another optic fiber connector socket (not shown) mated with the optic fiber connector assembly 100 is also configured as described above.

Figure 4:
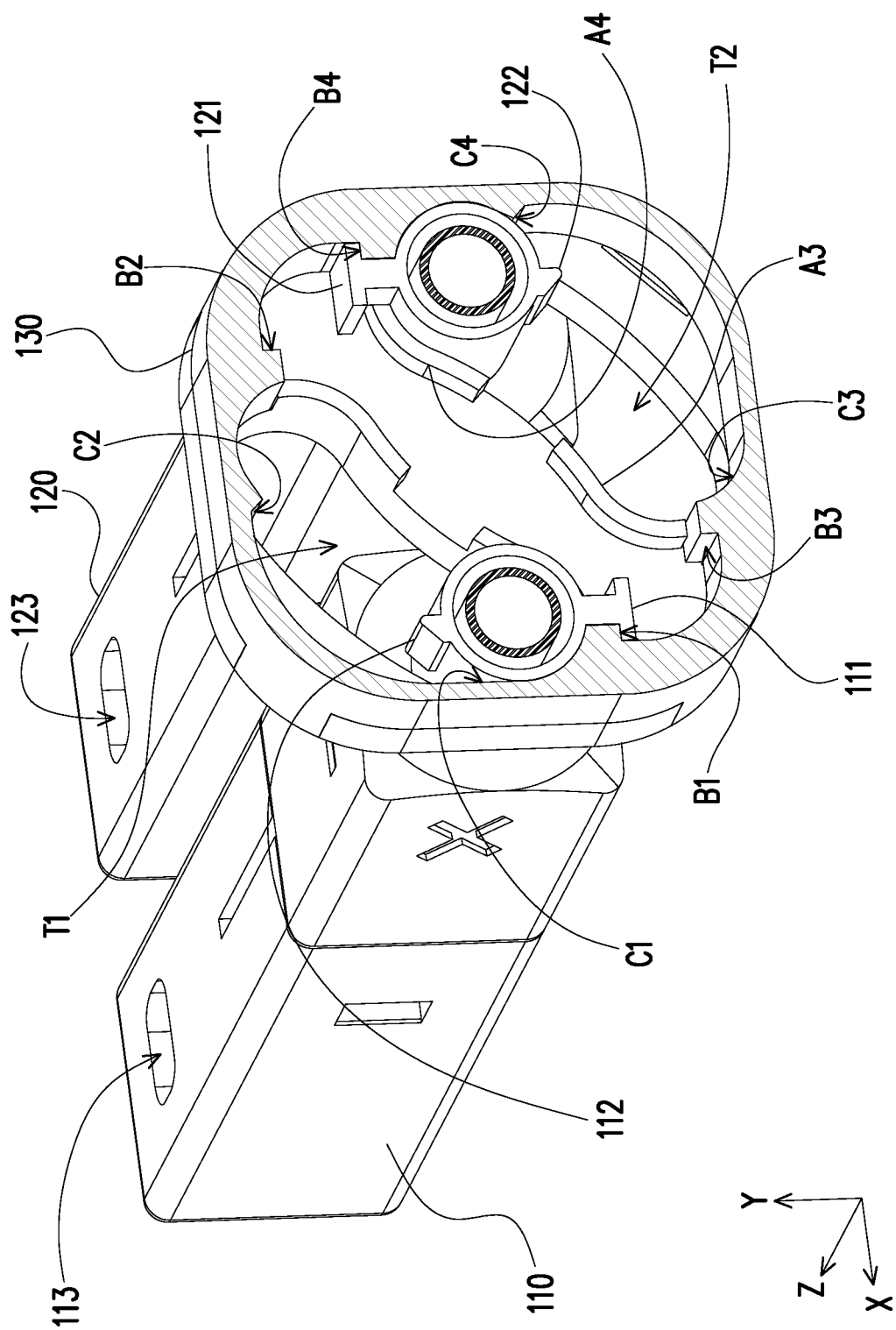
FIG. 4 is a partial cross-sectional view of the exchangeable optic fiber connector assembly of FIG. 1.

FIG. 4 is a partial cross-sectional view of the exchangeable optic fiber connector assembly of FIG. 1. Referring to FIG. 2 to FIG. 4 at the same time, in detail, the switching structure 130 of the embodiment includes a cover 131 and a housing 132 locked with each other, and the cover 131 and the housing 132 are locked with each other through a locking slot 131a on the cover 131 and a hook 132a on the housing 132, where the cover 131 has the aforementioned guiding slots T1 and T2. In addition, the switching structure 130 also has a plurality of second locking portions B1, B2, B3, B4 located on an inner wall of the housing 132, a plurality of second stopping portions C1, C2, C3, C4, and a plurality of guiding ribs A1, A2, A3, A4, where the guiding ribs A1-A4 are arranged along side edges of the guiding slots T1 and T2, where the guiding ribs A1, A2 are arranged at intervals along an inner side edge of the guiding slot T1, and the guiding ribs A3, A4 are arranged at intervals along an inner side edge of the guiding slot T2. In addition, two opposite ends of each of the guiding slots T1 and T2 are respectively provided with the second locking portions B1-B4 and the second stopping portions C1-C4, where the second locking portions B1, B2 and the second stopping portions C1 and C2 are respectively located at two opposite ends of the guiding slot T1, and the second locking portions B3, B4 and the second stopping portions C3 and C4 are respectively located at two opposite ends of the guiding slot T2. In another embodiment that is not illustrated, the hooks and the locking slots of the switching structure may be switched, i.e., the hooks of the cover are correspondingly locked to the locking slots of the housing, so as to achieve the same assembling effect as described above.

It should be noted that the first locking portions 111, 121 are located at plug tail sections of the optic fiber connectors 110, 120, and are convex portions with a T-shaped profile. The first stopping portions 112, 122 are located at the plug tail sections of the optic fiber connectors 110, 120 and are convex portions with a wedge-shaped profile. In the pair of optic fiber connectors 110, 120, the first locking portions 111, 121 and the first stopping portions 112, 122 are opposite to each other in inversion, and each of the optic fiber connectors 110, 120, the first locking portions 111, 121 and the first stopping portion 112, 122 face away from each other across the plug tail sections of the optic fiber connectors 110, 120. In this way, as shown in FIG. 4, each of the optic fiber connectors 110, 120 may be locked to one of the second locking portions B 1-B4 through the first locking portions 111, 121, and the second stopping portions C1-C4 next to the locked second locking portions B1-B4 are located on moving paths of the first stopping portions 112, 122.

Figure 5:
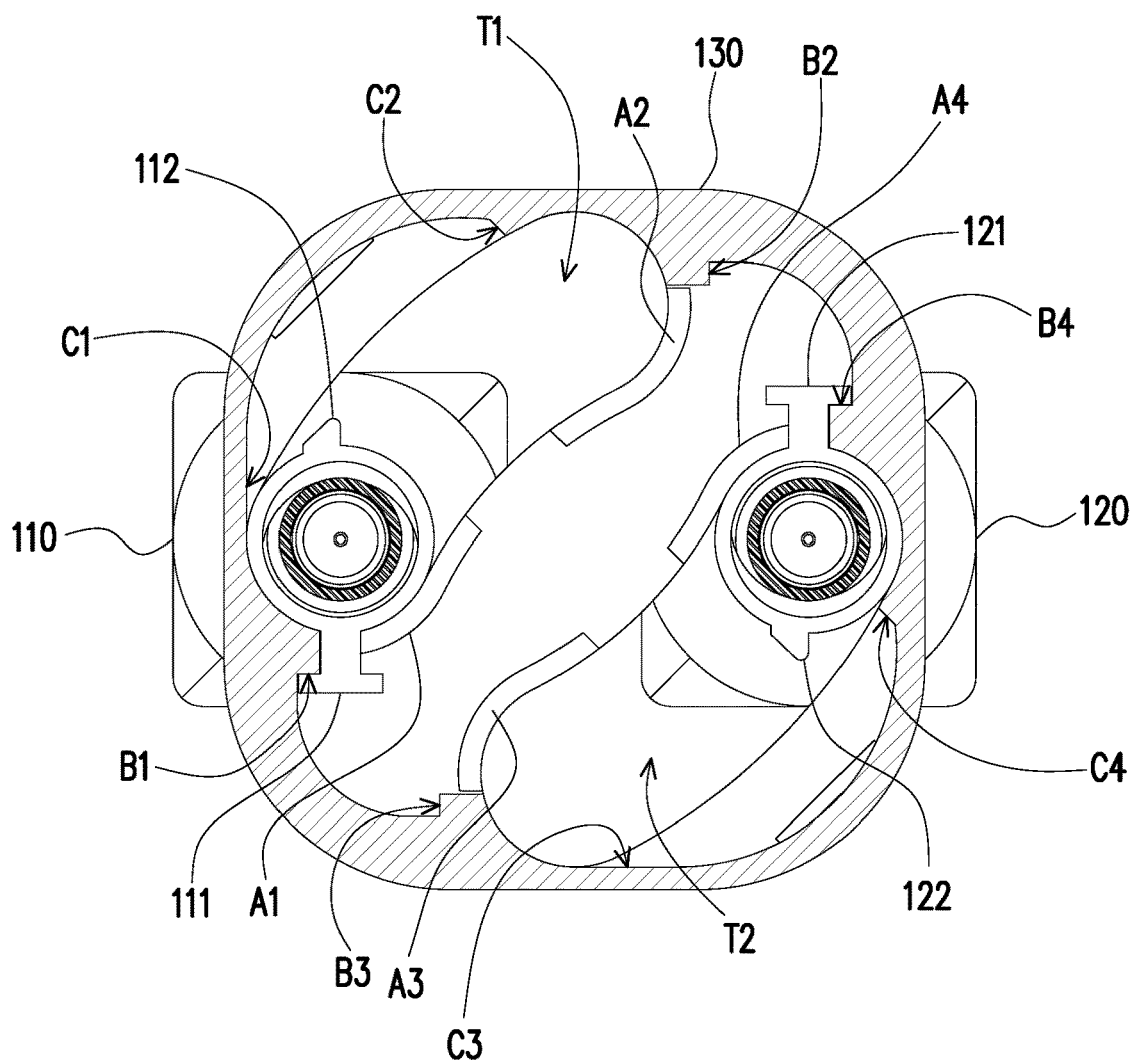
FIG. 5 to FIG. 8 illustrate an exchange process of optic fiber connectors.

FIG. 5 to FIG. 8 illustrate an exchange process of the optic fiber connectors, and the rectangular coordinates X-Y-Z inherit that of the aforementioned FIG. 1 to FIG. 4. Referring to FIG. 5 first, which has a same state as that shown in FIG. 4, the optic fiber connector 110 is located in the guiding slot T1, the first locking portion 111 is locked with the second locking portion B 1, and the first stopping portion 112 is away from the second stopping portion C1. The optic fiber connector 120 is located in the guiding slot T2, the first locking portion 121 is locked with the second locking portion B4, and the first stopping portion 122 is away from the second stopping portion C4.

Figure 6:
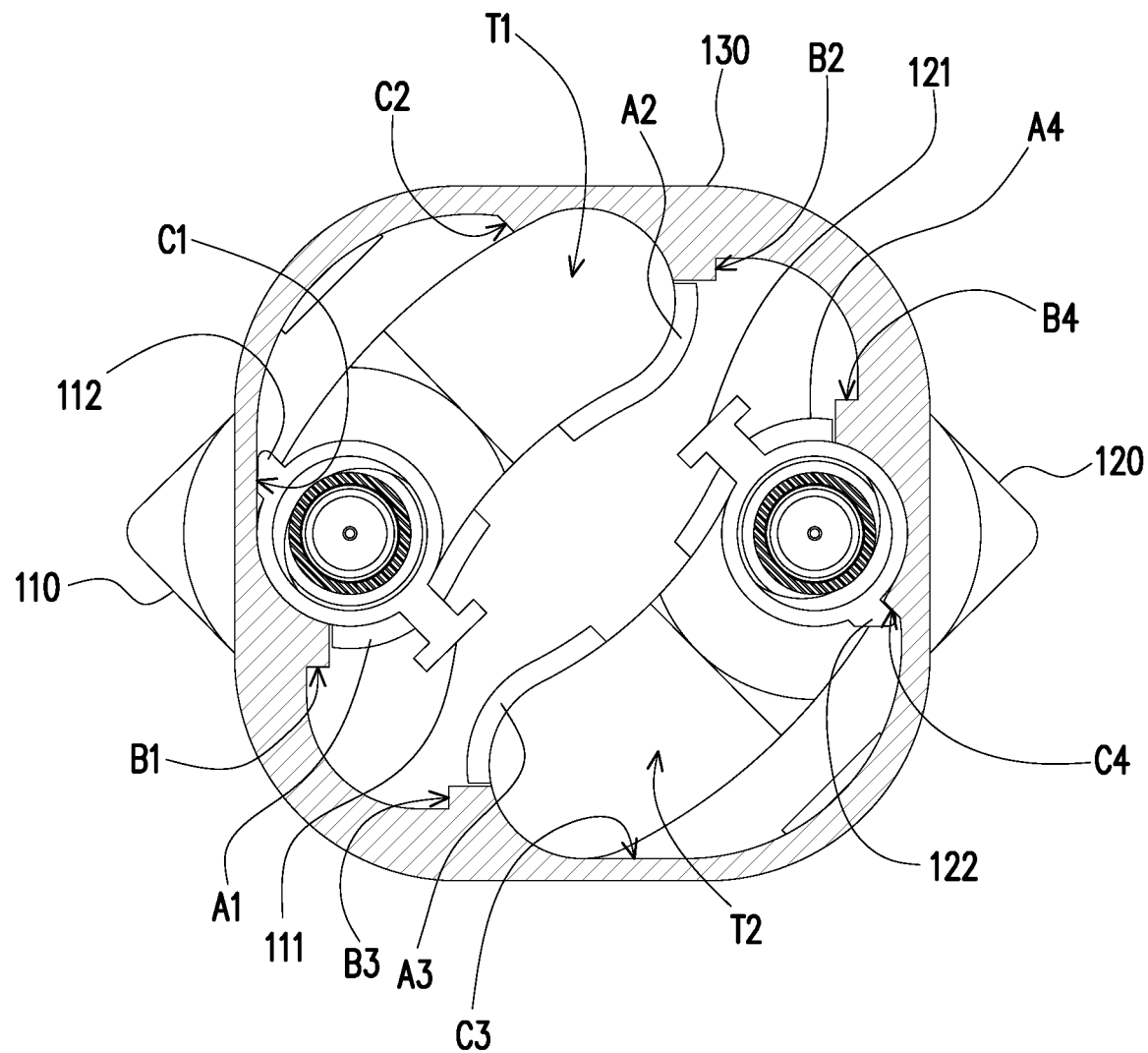

Then, referring to FIG. 5 and FIG. 6 at the same time, as described above, after the user removes the locking member 140, the fixing relationship between the optic fiber connectors 110, 120 and the switching structure 130 may be released, so that in FIG. 6, the user respectively drives the optic fiber connectors 110 and 120, such that the optic fiber connectors 110 and 120 are rotated in a counterclockwise direction while taking the Z-axis as a rotation axis to release the locking relationship that the first locking portion 111 is locked with the second locking portion B1 and first locking portion 121 is locked with the second locking portion B4, and since the second stopping portion C1 is located on a rotating path of the first stopping portion 112, and the second stopping portion C4 is located on a rotating path of the first stopping portion 122, the optic fiber connectors 110 and 120 may be maintained to the state shown in FIG. 6 after rotation.

Figure 7:
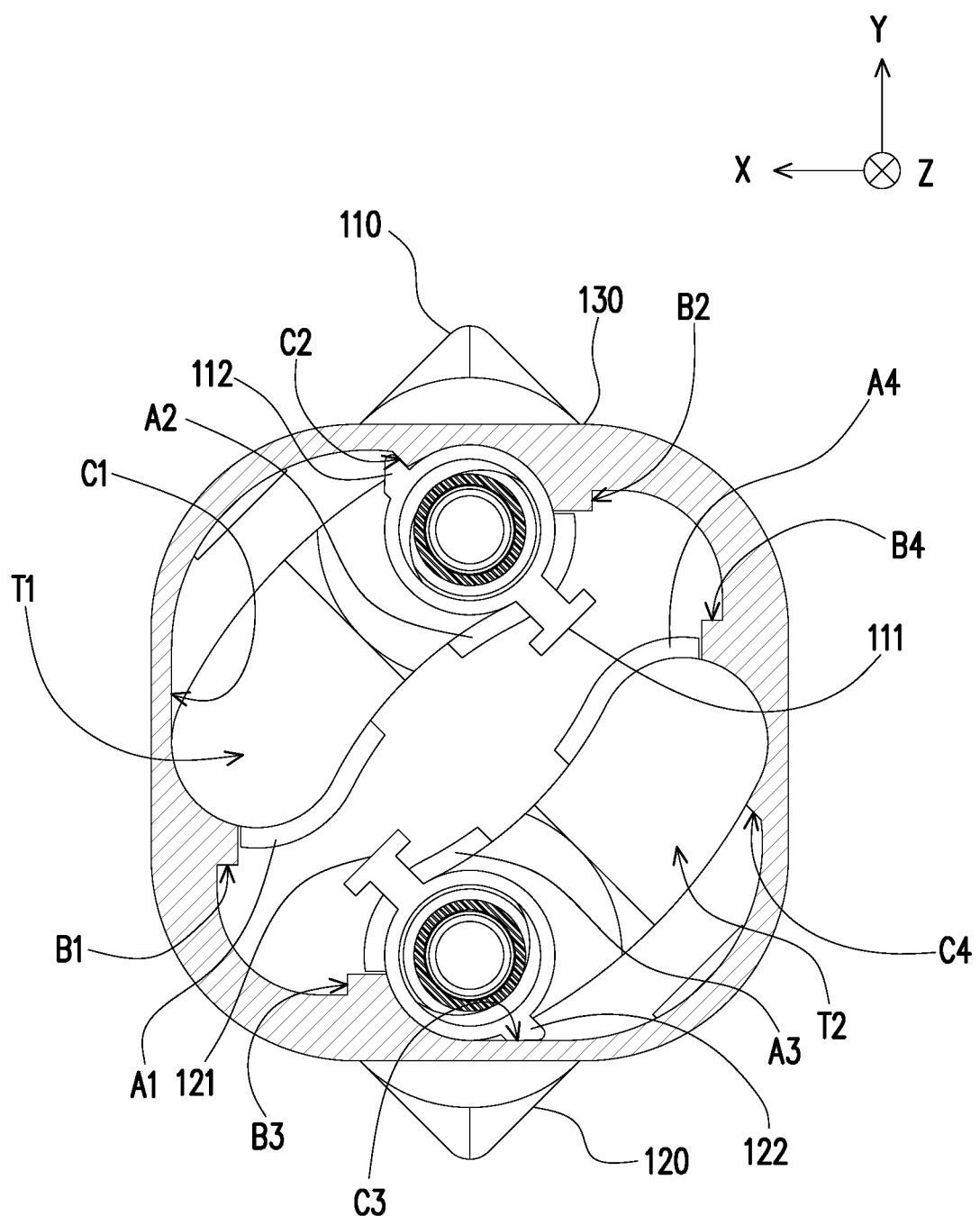

Then, referring to FIG. 6 and FIG. 7 at the same time, the user respectively drives the optic fiber connectors 110 and 120, through the collaboration of the first locking portion 111 with the guiding ribs A1, A2, and the collocation of the first locking portion 121 with the guiding ribs A3, A4 (i.e., head portions of the first locking portions 111 and 121 with the T-shaped profile movably lean against the guiding ribs A1-A4), the optic fiber connectors 110 and 120 are respectively moved along the guiding slots T1 and T2. The optic fiber connectors 110 and 120 are equivalent to moving in a clockwise direction. As shown in FIG. 7, regarding the guiding slot T1, the second stopping portion C2 is located on a moving path of the first stopping portion 112; regarding the guiding slot T2, the second stopping portion C3 is located on a moving path of the first stopping portion 122, so that the optic fiber connectors 110 and 120 may be smoothly stopped when moving to the opposite ends of the guiding slots T1 and T2, so as to maintain a state shown in FIG. 7.

Figure 8:
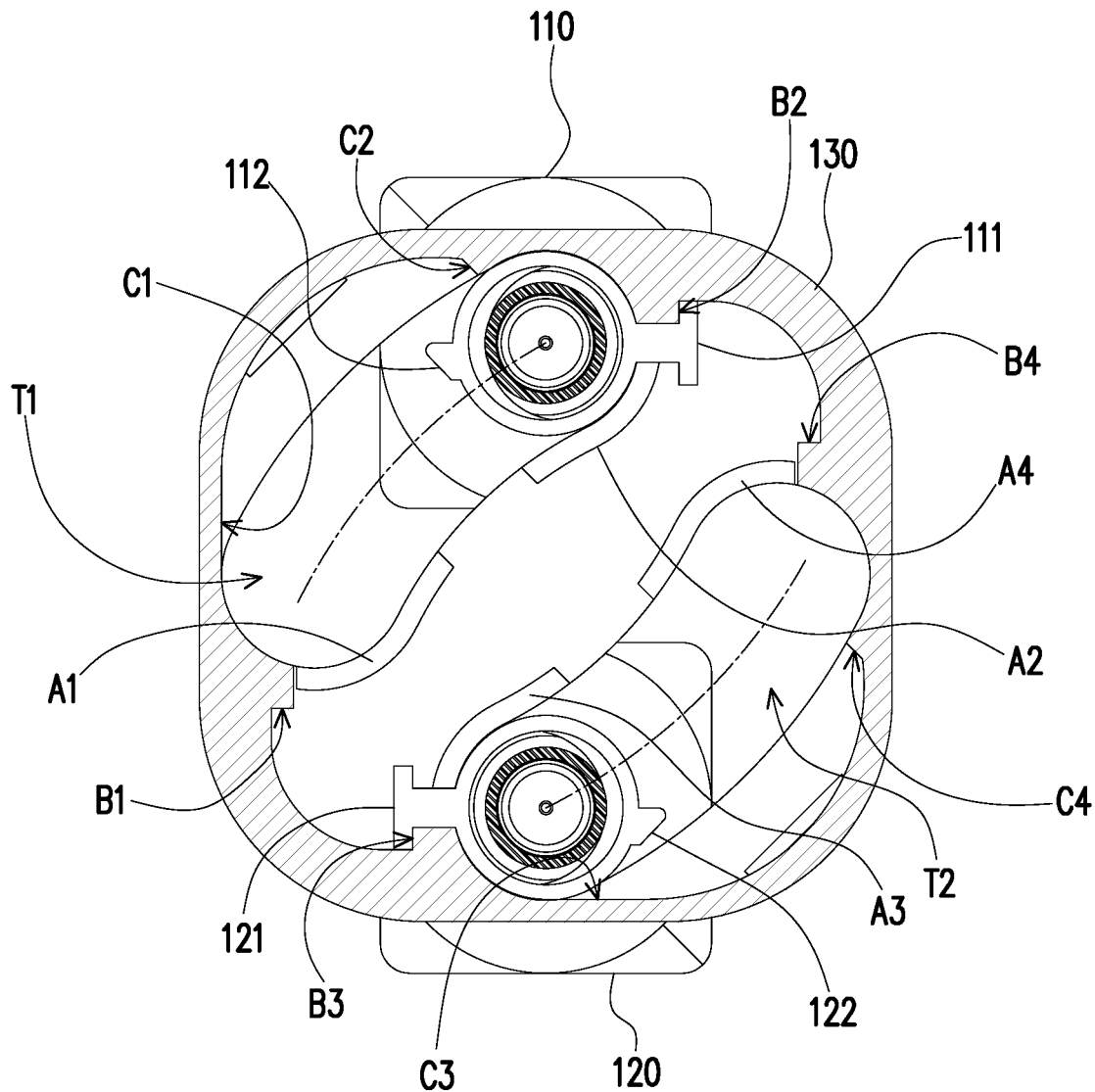

Finally, referring to FIG. 7 and FIG. 8 at the same time, the user respectively drives the optic fiber connectors 110 and 120 to rotate counterclockwise again until the first locking portion 111 is locked with the second locking portion B2, and the first locking portion 121 is locked with the second locking portion B3. In this way, the exchanging process of the optic fiber connectors 110 and 120 is completed. Comparing FIG. 5 with FIG. 8, it may be clearly known that the optic fiber connectors 110 and 120 are transformed from the X-Z plane to a Y-Z plane. Namely, by comparing FIG. 5 with FIG. 8, the optic fiber connectors 110 and 120 actually move along the arc-shaped trajectories shown by dotted chain lines in FIG. 8, and each of the guiding slots T1 and T2 has a central angle of 90 degrees. On the contrary, if the processes of FIG. 8 to 5 are performed in sequence, the optic fiber connectors 110 and 120 may be transformed to the X-Z plane.

Figure 9:
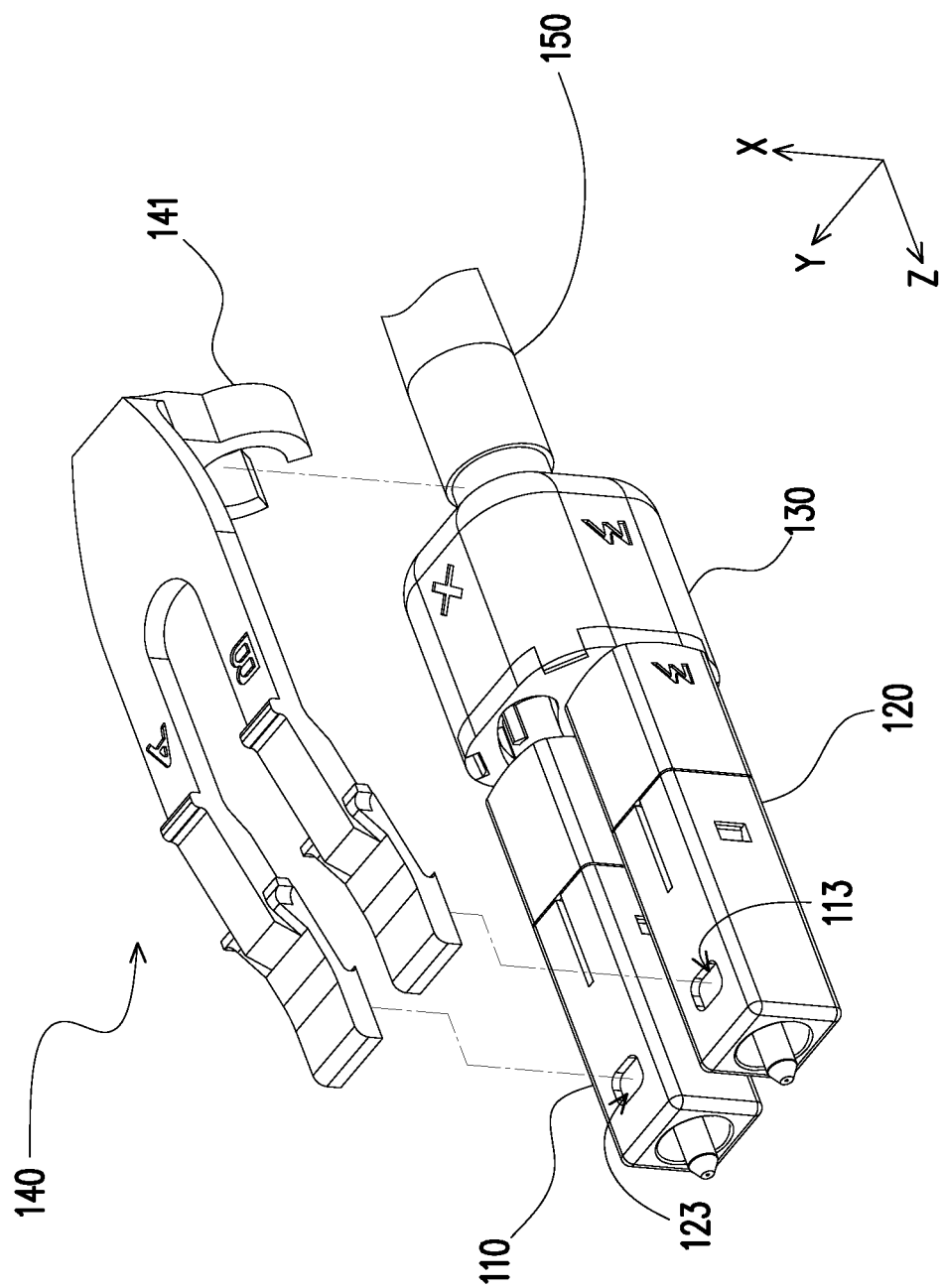
FIG. 9 is a schematic diagram of the optic fiber connectors after an exchange process.

FIG. 9 is a schematic diagram of the optic fiber connectors after the exchange process, which corresponds to the state shown in FIG. 8. Referring to FIG. 1 and FIG. 9 at the same time, after the exchange process of FIG. 5 to FIG. 8 described above, the user may lock the locking member 140 on the cable module 150 and the optic fiber connectors 110, 120 that are changed to be arranged side by side on the Y-Z plane as shown in FIG. 9, thereby limiting the rotation or movement of the optic fiber connectors 110 and 120 relative to the switching structure 130, and the optic fiber connectors 110 and 120 in this state have obviously achieved an exchanging effect compared with that shown in FIG. 1.

Figure 10:
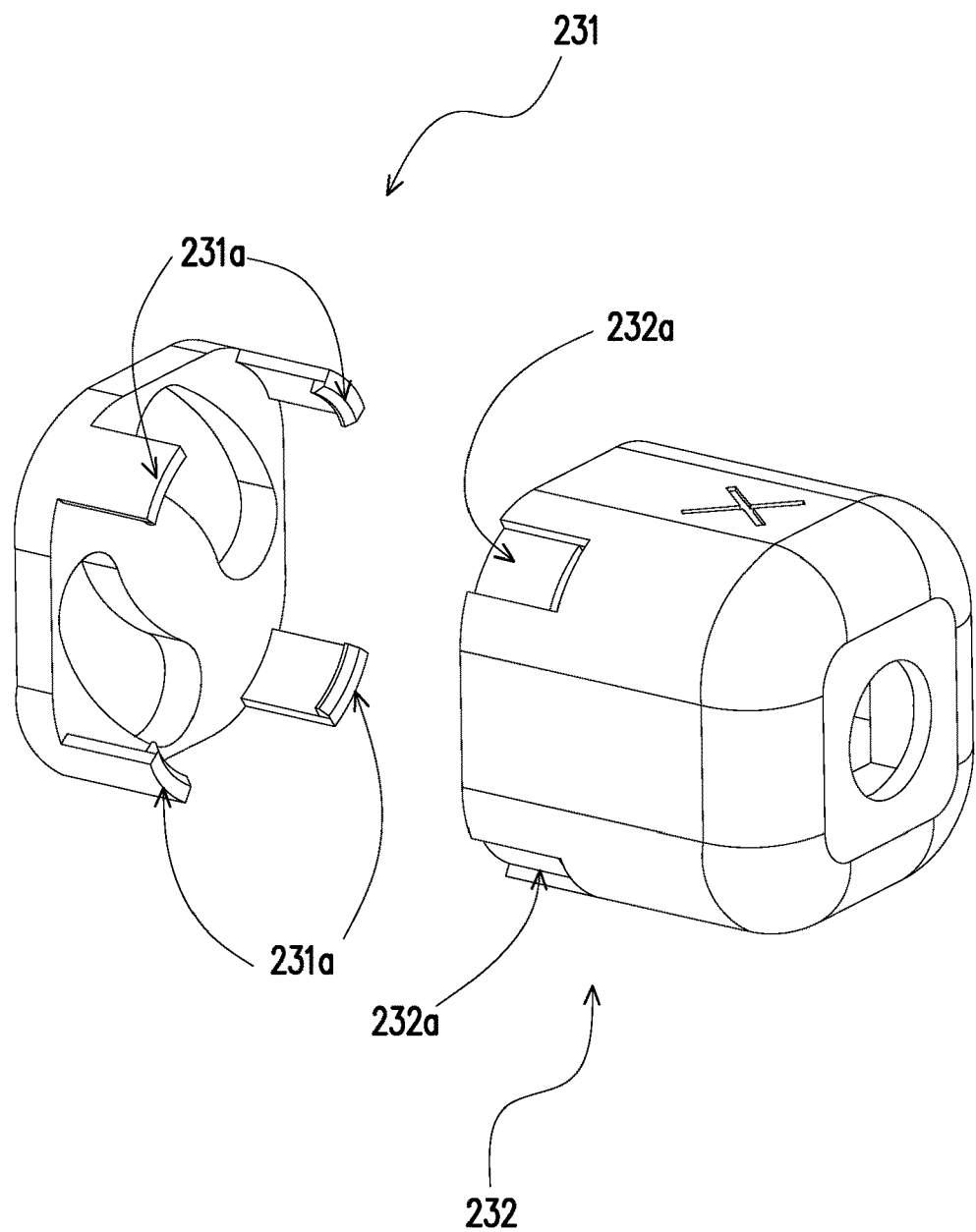
FIG. 10 is a schematic diagram of partial components of an exchangeable optic fiber connector assembly according to another embodiment of the invention.

FIG. 10 is a schematic diagram of partial components of an exchangeable optic fiber connector assembly according to another embodiment of the invention. Referring to FIG. 10 and comparing to FIG. 2 or FIG. 3, the embodiment provides another form of switching structure 230, the same as the aforementioned embodiment, the switching structure 230 also includes a cover 231 and a housing 232, where the same structural features as that of the aforementioned embodiment will not be repeated, and a difference there between is that the cover 231 has hooks 231a, and the housing 232 has locking slots 232a, which may also smoothly complete the assembling operation of the cover 231 and the housing 232.

In summary, in the embodiments of the invention, the pair of optic fiber connectors of the optic fiber connector assembly are respectively movably passes through the pair of guiding slots of the switching structure, so that the optic fiber connectors may move and rotate along the guiding slots, where each of the optic fiber connectors has the first locking portion and the first stopping portion adapted to produce/not produce structural interference with the second locking portion and the second stopping portion at two ends of the guiding slot for locking with or releasing from the switching structure. In other words, the optical fiber connector assembly is based on the switching structure, and the optical fiber connectors are respectively moved and rotated on the switching structure in partial circular trajectories. In brief, each optical fiber connector is equivalent to travelling a route with a central angle of 90 degrees along a circular trajectory and rotating itself by 90 degrees, where a moving direction is actually opposite to a rotation direction of itself, thereby achieving the effect of changing positions.

In this way, the user may change a position of the optic fiber connectors on the switching structure as described above according to actual needs, so as to adjust a docking orientation of the optic fiber connector assembly and a docked connector, thereby achieving the effect of switching the optic fiber connectors.

What is claimed is:

1. An exchangeable optic fiber connector assembly, comprising:
a pair of optic fiber connectors, each of the optic fiber connectors having a first locking portion and a first stopping portion; and
a switching structure, having a pair of guiding slots, and the pair of optic fiber connectors respectively passing through the pair of guiding slots to be movable and rotatable along the corresponding guiding slots, wherein the switching structure further has a plurality of second locking portions and a plurality of second stopping portions disposed at two opposite ends of each of the guiding slots, each of the optic fiber connectors is locked with one of the second locking portions through the first locking portion, and the second stopping portion next to the locked second locking portion is located on a moving path of the first stopping portion.

2. The exchangeable optic fiber connector assembly as claimed in claim 1, wherein the pair of guiding slots is a part of a circular trajectory.

3. The exchangeable optic fiber connector assembly as claimed in claim 2, wherein a central angle of each of the guiding slots is 90 degrees.

4. The exchangeable optic fiber connector assembly as claimed in claim 1, wherein optical signals transmitted/received by the pair of optic fiber connectors are different from each other.

5. The exchangeable optic fiber connector assembly as claimed in claim 1, further comprising a locking member and a cable module, wherein the pair of optic fiber connectors passes through the switching structure and is connected to the cable module, and the locking member is locked with the pair of optic fiber connectors and the cable module to limit the pair of optic fiber connectors from moving relative to the switching structure.

6. The exchangeable optic fiber connector assembly as claimed in claim 1, wherein the switching structure comprises a housing and a cover, the cover has the pair of guiding slots, and the housing has the plurality of second locking portions and the plurality of second stopping portions.

7. The exchangeable optic fiber connector assembly as claimed in claim 1, wherein the switching structure further has a plurality of guiding ribs respectively arranged on a side edge of each of the guiding slots, and each of the optic fiber connectors moves in the corresponding guiding slot along the guiding rib through the first locking portion.

8. The exchangeable optic fiber connector assembly as claimed in claim 7, wherein the switching structure comprises a housing and a cover, the cover has the pair of guiding slots, and the housing has the plurality of second locking portions, the plurality of second stopping portions, and the plurality of guiding ribs.

9. The exchangeable optic fiber connector assembly as claimed in claim 1, wherein the first locking portions and the first stopping portions of the pair of optic fiber connectors are opposite to each other in inversion.

10. The exchangeable optic fiber connector assembly as claimed in claim 1, wherein the first locking portion is located at a plug tail section of the optic fiber connector and is a convex portion with a T-shaped profile.

11. The exchangeable optic fiber connector assembly as claimed in claim 1, wherein the first stopping portion is located at a plug tail section of the optic fiber connector and is a convex portion with a wedge-shaped profile.

12. The exchangeable optic fiber connector assembly as claimed in claim 1, wherein the first locking portion and the first stopping portion face away from each other across a plug tail section of the optic fiber connector.

13. The exchangeable optic fiber connector assembly as claimed in claim 1, wherein each of the optic fiber connectors is locked with one of the second locking portions through the first locking portion, the second stopping portion next to the locked second locking portion is located on a rotating path of the first stopping portion, and the pair of optic fiber connectors rotate in a same direction to be locked with the switching structure at the same time or released from the switching structure at the same time.

* * * * *